(12) United States Patent
Schenk, Jr.

(10) Patent No.: US 6,994,305 B2
(45) Date of Patent: Feb. 7, 2006

(54) MAGNETIC MOUNTING ASSEMBLY

(75) Inventor: William P. Schenk, Jr., Rockford, TN (US)

(73) Assignee: Robertshaw Controls Company, Richmond, VA (US)

( * ) Notice: Subject to any disclaimer, the term of this patent is extended or adjusted under 35 U.S.C. 154(b) by 539 days.

(21) Appl. No.: 10/004,485

(22) Filed: Nov. 2, 2001

(65) Prior Publication Data
US 2002/0145090 A1 Oct. 10, 2002

Related U.S. Application Data

(60) Provisional application No. 60/282,055, filed on Apr. 7, 2001.

(51) Int. Cl.
A47B 96/06 (2006.01)
(52) U.S. Cl. .................. 248/205.1; 335/285; 73/866.5
(58) Field of Classification Search .............. 73/866.5; 335/286, 285; 294/65.5; 248/205.1
See application file for complete search history.

(56) References Cited

U.S. PATENT DOCUMENTS

| | | | |
|---|---|---|---|
| 2,743,353 A | | 4/1956 | Nicholson et al. |
| 2,875,324 A | * | 2/1959 | Paulson et al. ............. 362/398 |
| 3,206,905 A | | 9/1965 | Wavering et al. |
| 3,302,678 A | | 2/1967 | Leguillon |
| 3,363,209 A | * | 1/1968 | Pevar ......................... 335/286 |
| 3,497,846 A | * | 2/1970 | Keller ......................... 335/296 |
| 3,596,967 A | * | 8/1971 | Carter ......................... 294/65.5 |
| 4,019,373 A | * | 4/1977 | Freeman et al. .............. 73/644 |
| 4,058,335 A | | 11/1977 | Abe |
| RE30,519 E | * | 2/1981 | Hougen ........................ 408/76 |
| 4,363,402 A | | 12/1982 | Grzyll |
| 4,390,309 A | * | 6/1983 | Fangmann .................... 408/76 |
| 4,398,424 A | * | 8/1983 | Abts ............................ 73/632 |
| 4,652,845 A | * | 3/1987 | Finkle ......................... 335/285 |
| 4,754,532 A | | 7/1988 | Thomson et al. |
| H000865 H | * | 1/1991 | Sery et al. ................... 102/306 |
| 5,194,730 A | | 3/1993 | Herberger et al. |
| 5,249,912 A | | 10/1993 | Warga, III |
| 5,358,228 A | | 10/1994 | Beere |
| 5,361,555 A | | 11/1994 | Walker |
| 5,405,004 A | | 4/1995 | Vest et al. |
| 5,472,163 A | | 12/1995 | Callas |
| 5,585,809 A | | 12/1996 | Yajima et al. |
| 5,623,769 A | | 4/1997 | Hayden |
| 5,642,089 A | * | 6/1997 | Lysen .......................... 335/285 |
| 5,699,910 A | | 12/1997 | Kubat |

(Continued)

FOREIGN PATENT DOCUMENTS

FR 74 15143 4/1974

(Continued)

Primary Examiner—Hezron Williams
Assistant Examiner—John Fitzgerald
(74) Attorney, Agent, or Firm—Sampson & Associates, P.C.

(57) ABSTRACT

Provided is a magnet mounting assembly including a ferromagnetic support plate having a periphery, two opposite faces, and a ferromagnetic plate extension depending from the periphery, and a permanent magnet disposed on the support plate, in which the plate extension has a plurality of heights forming a plurality of legs. A terminal edge of the legs is engagable with a rounded magnetic surface at four non-contiguous locations thereon. The plate extension may form a V-block. Also provided are methods of utilizing such a magnet mounting assembly to securely and stably attach a device, such as a measurement device, to a rounded ferromagnetic surface, such as the exterior surface of a storage tank. A measurement device/storage tank assembly including such a magnet mounting assembly is also provided.

33 Claims, 3 Drawing Sheets

U.S. PATENT DOCUMENTS

| | | |
|---|---|---|
| 5,853,273 A | 12/1998 | Coffey |
| 5,895,018 A | 4/1999 | Rielo |
| 5,980,203 A * | 11/1999 | Zatorski et al. .......... 415/173.4 |
| 5,993,990 A | 11/1999 | Kanto et al. |
| 6,000,688 A | 12/1999 | Giangrasso |
| 6,054,790 A | 4/2000 | Kjeer et al. |
| 6,279,885 B1 | 8/2001 | Leon, Jr. |

FOREIGN PATENT DOCUMENTS

| | | | |
|---|---|---|---|
| GB | 91 183484/25 | | 3/1991 |
| JP | 63260738 A | * | 10/1988 |
| JP | 2003145973 A | * | 5/2003 |
| WO | 200054614 A | * | 9/2000 |

* cited by examiner

MAGNETIC MOUNTING ASSEMBLY

RELATED APPLICATION

This application claims the benefit of U.S. Provisional Patent Application Ser. No. 60/282,055, entitled Magnetic Mounting Assembly, filed on Apr. 7, 2001.

FIELD OF THE INVENTION

The present invention relates in general to a mounting assembly for attaching a device to a rounded surface and more particularly to a magnet mounting assembly for detachably mounting a device to a rounded magnetic surface and to methods for detachably mounting a device to a rounded magnetic surface. This invention also relates to a combination of a measurement device and a storage tank that have been coupled to one another utilizing this magnet mounting assembly.

BACKGROUND INFORMATION

Storage tanks for fuel, oil, propane, natural gas, and other liquid materials are typically cylindrical or spherical. Since the majority of these storage tanks are made of ferrous materials, a magnet mounting base is one choice for making a semi-permanent attachment to the tank, i.e., an attachment that is stably and securely mounted but that can be easily detached, if desired. However, the curved or rounded external shape of the tank does not lend itself to the attachment of the flat magnet mounting bases known in the art, as, for example, described in U.S. Pat. No. 3,206,905 to Wavering et al. and U.S. Pat. No. 5,585,809 to Yajima et al., the disclosures of which are fully incorporated herein by reference. Also, in another example of a magnet mounting base with a flat planar contact edge on its base, U.S. Pat. No. 5,405,004 to Vest et al., the disclosure of which is fully incorporated herein by reference, describes a cup style magnet for use in attaching a tray to a metal surface where a magnet is disposed within a cup-shaped ferromagnetic support having a cylindrical side wall that terminates at a generally circular and planar support rim. U.S. Pat. No. 5,699,910 to Kubat describes a pair of pivotal magnet assemblies to couple a tray to a non-flat surface.

One approach for magnet mounting bases is the use of magnet support legs, as for example described in U.S. Pat. No. 4,363,402 to Grzyll, to prevent a receptacle from moving when placed on an inclined surface. Another approach for magnet mounting bases is the use of spaced apart magnet bars and a support ring disposed between the bars, as for example described in U.S. Statutory Invention Registration No. H865 to Sery et al. for attaching a torch to a flat, curved, or irregular magnetic surface.

An easily detachable magnet mounting base that fastens securely and stably to a rounded magnetic surface without the complexity of additional movable parts, such as pivotal components, or without the complexity of fabricating multiple permanent magnets as bars or legs into a mounting base, would be advantageous for reliable and economical attachment of various devices to rounded surfaces, such as to the typically cylindrical or spherical exterior surfaces of storage tanks.

SUMMARY

One aspect of the present invention pertains to a magnet mounting assembly for use in detachably mounting a device to a rounded ferromagnetic surface of a liquid storage tank. The assembly includes a ferromagnetic support plate including a central axis, and an interior face. A ferromagnetic plate extension depends from the interior face, and a permanent magnet is disposed on the interior face. The plate extension is sized and shaped with a plurality of axial heights relative to the plate, to form a plurality of legs having terminal edges configured to engage the rounded ferromagnetic surface at a plurality of non-contiguous locations thereon. This and the other embodiments of this invention advantageously provides a single mounting assembly capable of making secure and stable contact with rounded surfaces of various topologies, including both cylindrical and spherical topologies.

Another aspect of this invention pertains to a method of detachably mounting a device to a rounded magnetic surface. The method includes providing a magnet mounting assembly of the type set forth in the previous paragraph, providing a device, and disposing the device on an exterior face of said support plate to form a magnetic mounting device. The method further includes engaging the magnetic mounting assembly with a rounded magnetic surface, so that the terminal edges of the legs contact the rounded magnetic surface in a plurality of non-contiguous locations thereon.

Still another aspect of the present invention pertains to a measurement device/storage tank assembly including a storage tank having an exterior rounded ferromagnetic surface, and a magnetic mounting measurement device disposed thereon. The magnetic mounting measurement device includes a measurement device and a magnet mounting assembly fastened to one another. The magnet mounting assembly includes a ferromagnetic support plate having a periphery, an exterior face, an interior face, and a plate extension disposed on said periphery, the plate extension being on the same side of said support plate as the interior face and having a plurality of heights, wherein the plate extension has four legs having heights greater than the heights of the remainder of the plate extension. A permanent magnet is disposed on the interior face of the support plate, so that terminal edges of the four legs are magnetically engaged with the rounded magnetic surface at four non-contiguous locations thereon.

As one of skill in the art will appreciate, features of one embodiment and aspect of the invention are applicable to other embodiments and aspects of the invention.

BRIEF DESCRIPTION OF THE DRAWINGS

The above and other features and advantages of this invention will be more readily apparent from a reading of the following detailed description of various aspects of the invention taken in conjunction with the accompanying drawings, in which.

DETAILED DESCRIPTION

Figure 1:
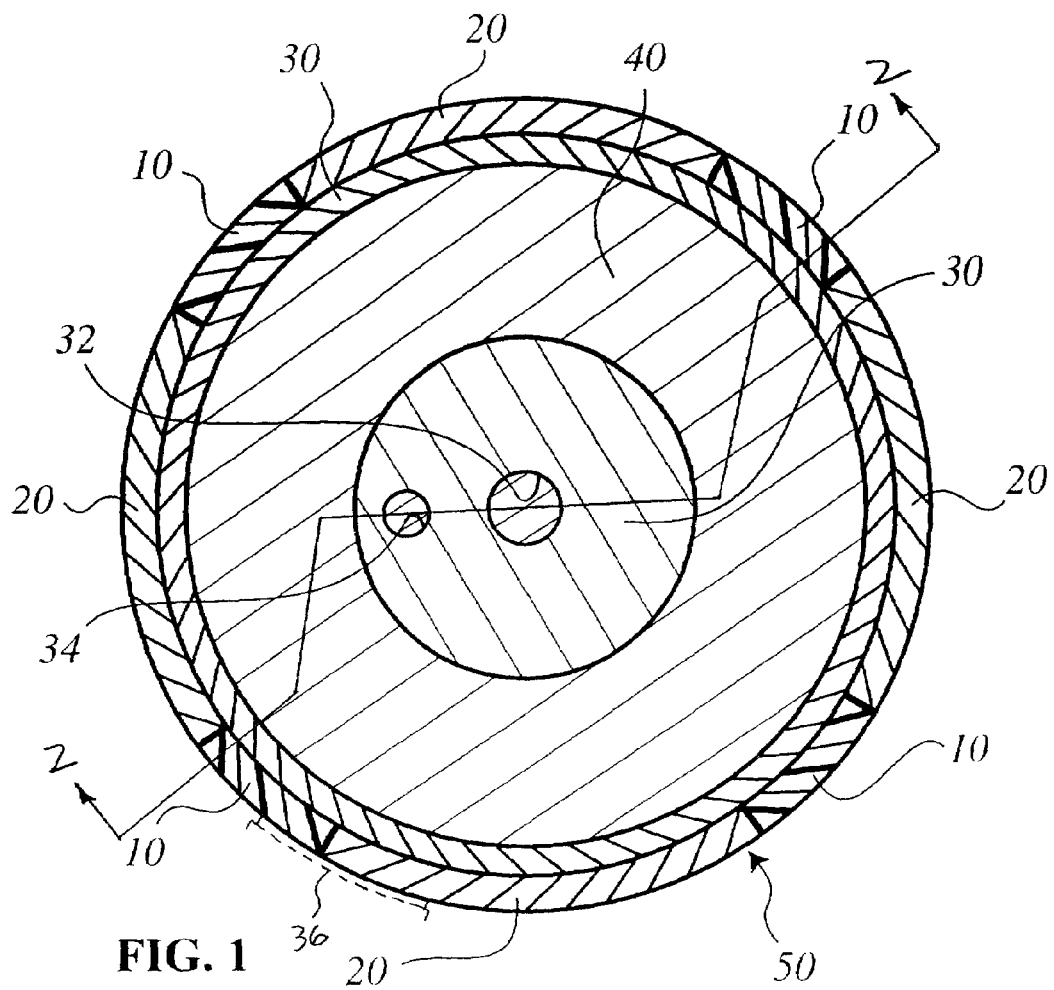
FIG. 1 is a bottom view of one embodiment of a magnetic mounting assembly of the present invention.

Referring to the figures set forth in the accompanying Drawings, the illustrative embodiments of the present invention will be described in detail hereinbelow. For clarity of exposition, like features shown in the accompanying drawings shall be indicated with like reference numerals and similar features as shown in alternate embodiments in the drawings shall be indicated with similar reference numerals.

One aspect of the present invention pertains to a magnet mounting assembly for use in detachably mounting a device to a rounded magnetic surface. The magnet mounting assembly of this invention is particularly preferred for use in detachably mounting a measurement device to the exterior cylindrical or spherical magnetic surface of a storage tank, such as for example, to storage tanks of various diameters and geometries such as round or spherical with diameters between 3 and 9 feet. As used herein, the term "ferromagnetic" pertains to the property of a material in which the internal magnetic moments spontaneously organize in a common direction. The term "axial" and/or "axially" refers to a direction substantially parallel to the central axis of circular support plate 35 as shown in the Figures. The term "transverse" refers to a direction substantially orthogonal to the axial direction. The term "non-contiguous," as used herein, means not touching or not in continuous connection.

Figure 2:
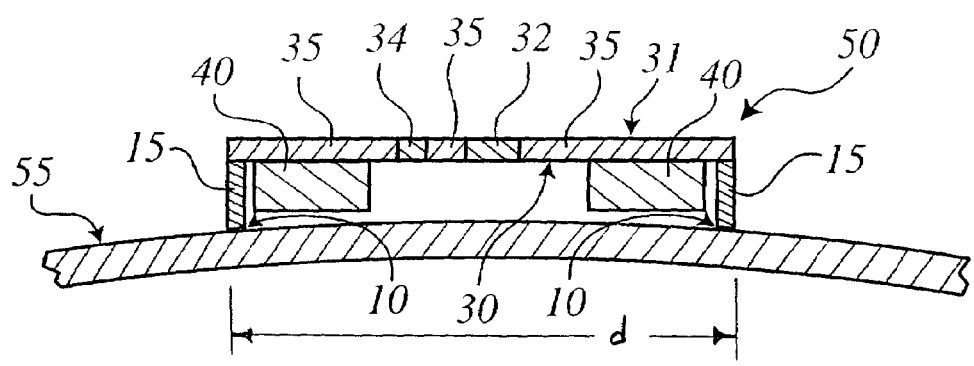
FIG. 2 is a cross-sectional elevational view taken along 2—2 of FIG. 1.

Referring to FIGS. 1 and 2, one embodiment of the magnet mounting assembly 50 of the present invention includes a ferromagnetic support plate 35 having interior and exterior faces 30 and 31, respectively. At least one ferromagnetic plate extension (also referred to as a leg) 15, extends axially from interior face 30, and terminates at distal edge 10 thereof. Attached to face 30 is at least one permanent magnet 40. Magnet 40 may include substantially any of a variety of permanent magnets known in the art. Suitable permanent magnets include, but are not limited to, ceramic disc magnets. In one embodiment, the magnet is bonded to the interior face 30 of the support plate 35 with a bonding adhesive, such as, for example, an epoxy-based adhesive. In the embodiment shown, a single annular (e.g., generally doughnut shaped) magnet 40 is used. Alternatively, magnet 40 may include a plurality of magnets disposed in spaced relation along the periphery of the plate 35.

As shown, assembly 50 may include a plurality of legs 15, each terminating at an edge 10, being disposed axially further from plate 35 than those portions of the plate terminating axially at edges 20. In one embodiment, edges 20 may be disposed on plate 35, while alternatively, edges 20 may be disposed on plate extensions (walls) having an axially dimension less than that of legs 15. As illustrated in FIG. 1, the magnet mounting assembly 50 has four legs 15 plate extension. The distribution and width of the legs 15 plate extension may vary over a wide range, depending on the desired application, as long as they make a secure and stable contact and are in contact at spaced mutually non-contiguous locations on the rounded ferromagnetic surface 55 (FIG. 2) on which they are placed.

A magnet mounting base of a cup style magnet with a doughnut shaped magnet potion surrounded by a ferromagnetic cup with a flat and planar circular outer perimeter edge, as for example described in U.S. Pat. No. 5,405,004 to Vest et al., may contact a rounded ferromagnetic surface in two non-contiguous locations but would not be stably and securely attached due to the limited and inefficient amount and the unbalanced distribution provided by only two contact points at once between the planar outer perimeter edge and the rounded magnetic surface. The ferromagnetic cup around the permanent magnet may be altered to have a rounded "saddle" shape along the outer perimeter edge in order to match and contact the rounded magnetic surface in contiguous locations and to provide a secure and stable attachment. However, it would be problematical and complex to fabricate this "saddle" shape for the outer perimeter edge to give an exact fit, especially in view of the variety of curvatures present in various magnetic surfaces to which it is desired to attach a device. In the case of the "saddle" shape, if the fit is not exact and contiguous at all locations, the attachment may not be secure and stable and may not provide the desired vertical orientation of the device on the rounded magnetic surface.

As illustrated in FIG. 1, the support plate 35 may also include an aperture 32 through which a fastener may be inserted in order to attach a device, such as some type of a measurement device 65 (FIG. 5), to the exterior support plate 35, as will be discussed hereinbelow. The fastener may include nominally any of the fasteners known in the art of fastening multiple parts together, such as, for example, a bolt that may be screwed into a threaded opening on the device. Other forms of attachment of the device to the support plate may be utilized, such as, for example, rivets and bonding adhesives. Also, the ferromagnetic support plate 35 may include another aperture 34 for use in aligning the device in a desired location and orientation on the support plate 35 of the magnet mounting assembly 50.

Turning to FIG. 2 in particular, edges 10 of two of the legs 15 are shown in contact at non-contiguous locations with rounded magnetic surface 55. Magnet 40 is attached to the interior face 30 of a ferromagnetic support plate 35 whose exterior face 31 is on the side opposite to the interior face 30. In this cross-sectional side view of FIG. 2, the ferromagnetic support plate 35 may also have an aperture 32 through which a fastener may be inserted in order to attach a device to the exterior face 31 of the support plate 35 and may have an aperture 34 for use in aligning the device in a desired location and orientation on the support plate 35 of the magnet mounting assembly 50.

The ferromagnetic support plate 35 of the present invention, including its perimeter and surfaces, may be fabricated in a variety of shapes and configurations, as long as it is capable of supporting both the attachment of at least one permanent magnet 40 and includes a suitable ferromagnetic plate extension comprising, for example, two or more legs or a V-block (as discussed hereinbelow), for secure and stable attachment to a rounded magnetic surface, and as long as the support plate 35 is capable of supporting the desired device on the side of the support plate opposite the permanent magnet (e.g., on the exterior face thereof). In a preferred embodiment, the support plate is substantially flat and, preferably, the plate extension is substantially perpendicular (i.e., extending axially therefrom). Suitable shapes for the perimeter of the support plate 35 include rounded shapes, such as circular and elliptical, and non-rounded shapes, such as square and rectangular.

As shown, magnetic surface 55, to which the magnet mounting assembly 50 of this invention attaches to, may be of substantially any topography, including non-planar surfaces such as generally rounded convex, concave, or otherwise arcuate surface, for example, cylindrical surfaces, spherical surfaces, and/or combinations thereof. In a preferred embodiment, the rounded magnetic surface 55 may be an exterior surface of a storage tank. Moreover, the present invention may also advantageously be used on substantially planar surfaces.

The ferromagnetic metals utilized in the support plate 35 and the plate extension (legs) 15 of the assembly 50 may comprise any of the ferromagnetic metals known in the art. Suitable ferromagnetic metals include, but are not limited to, iron and nickel. Using such materials effectively enables the assembly 50 to direct the magnetic flux from the magnet 40 to the distal edges 10 of the plate extension (e.g., legs or V-block) 15, to achieve a strong magnetic linkage of the assembly 50 to the surface 55.

Figure 3:
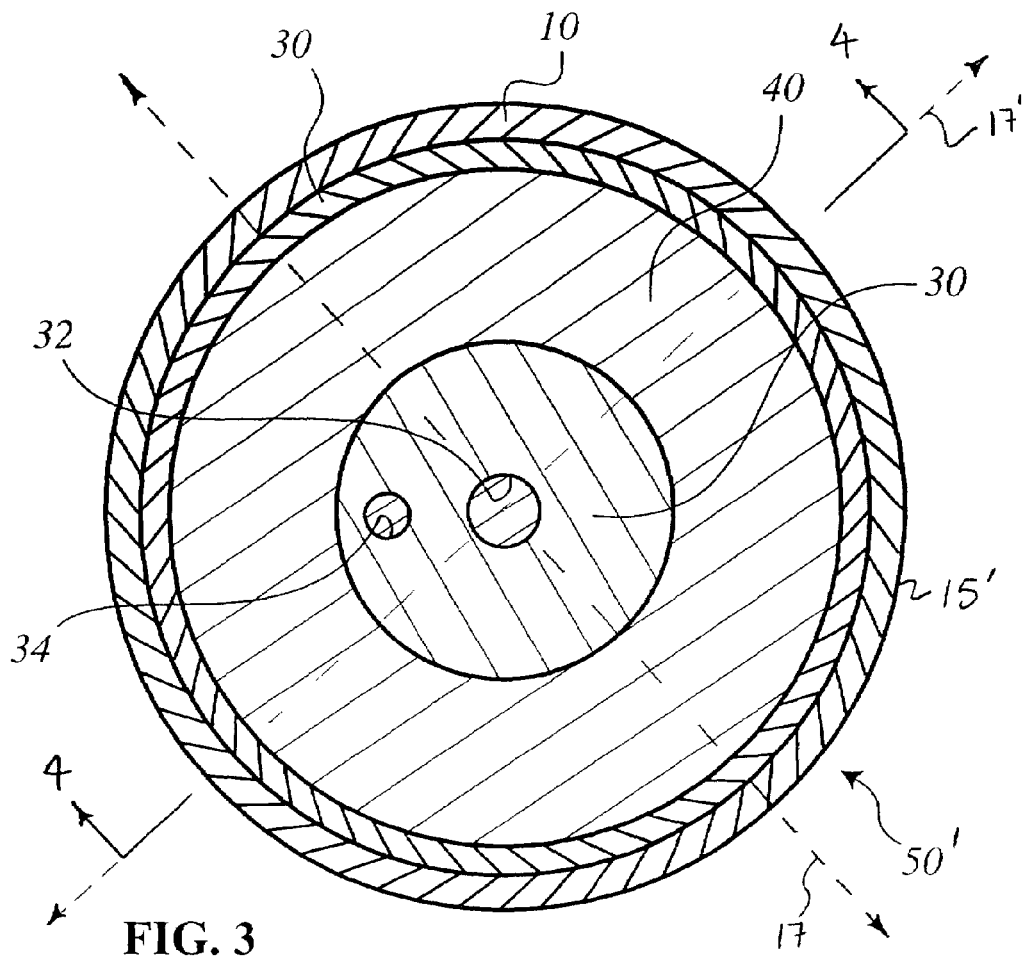
FIG. 3 is a view similar to that of FIG. 1, of an alternate embodiment of the present invention.
Figure 4:
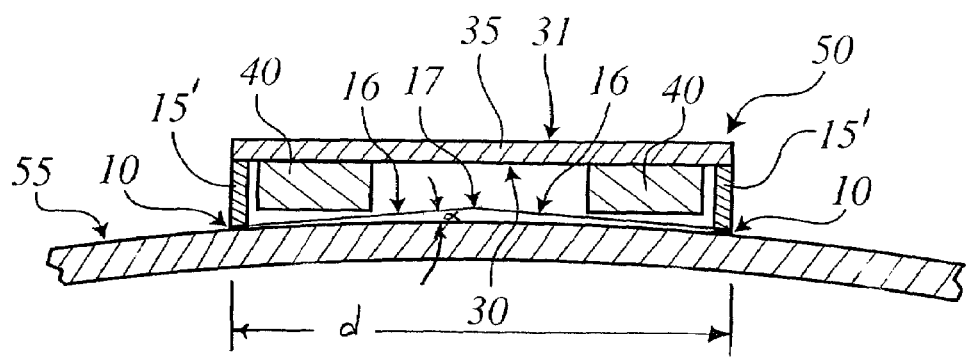
FIG. 4 is a cross-sectional elevational view taken along 4—4 of FIG. 3.

In a particular embodiment of the present invention, magnet mounting assembly 50 may optionally include a non-sparking layer 36 superposed with support plate 35 and/or plate extension 15, as partially shown in phantom. Such a construction may be desirable in the event the assembly 50 is used to mount devices to liquid gas or other fuel storage tanks in which there may be a hazardous level of a flammable vapor present. The layer 36 thus helps insure that no sparks are generated in the event assembly 50 is dropped or is otherwise struck against the surface of the storage tank or some other object. Suitable materials from which the non-sparking surface layer 36 may be constructed, include those known in the art of non-sparking surface layers on a metal, such as, for example, brass or stainless steel. Referring to FIGS. 3 and 4, an alternate embodiment of the present invention is shown as magnet mounting assembly 50'. This embodiment is substantially similar to assembly 50, excepting that wall 15' extends substantially continuously about the periphery of plate 35.

As best shown in FIGS. 3 and 4 edges 10' of opposite portions of wall 15' may extend obliquely (at angle α as shown) relative to the transverse direction to define a pair of planes 16 that intersect with one another at a line 17 (shown in phantom in FIG. 3). (Each of these opposite wall portions thus effectively form opposite 'legs'.) As also shown, the maximum axial height of the edges 10' is greater than the axial height of magnet 40. Moreover, as also shown, the axial height of the edges 10', may be chosen in combination with angle α, so that the magnet 40 does not extend through the planes 16, to advantageously help prevent contact of the magnet with surface 55. In this manner, wall 15' of magnet mounting assembly 50' effectively forms a conventional V-block type arrangement, in which the edges 10' comprise a V-groove, having an apex 17 thereof. In such a configuration, portions of the edges 10' make nominally tangential contact with magnetic surface 55, to provide a stable support, and to enable magnet 40 to make magnetic contact (nominally without making physical contact) with the surface 55.

The edges 10, 10' of legs 15 define a geometry (e.g., a notional circle as shown in FIG. 1, or an actual circle as shown in FIG. 3) having a transverse dimension d (FIG. 4), which, in the embodiments shown, is nominally equivalent to the maximum transverse dimension (e.g., diameter) of plate 35. The skilled artisan will recognize, however, that in the event the legs 15 extend obliquely relative to plate 35, then the transverse dimension d may be greater or less than the maximum transverse dimension of plate 35. Moreover, although the geometries defined by legs 15 are shown as circles, the skilled artisan will recognize that substantially any geometry, such as ovals, squares, or other polygons, may be defined by legs 15 without departing from the spirit an scope of the present invention.

Various embodiments of the present invention are provided with a numerical ratio (d:α) of transverse dimension d (in inches) to angle a (in degrees) within a range of about 1:0.5 to 1:2. Particular embodiments may include a ratio of (d:α) within a range of about 1:1 to 1:1.5. These ranges of angle a facilitate forming a secure V-block mating to a surface 55 having a radius of curvature r between about 1.5 and 4.5 feet, such as found on the storage tanks described hereinabove.

For example, in an embodiment in which the transverse dimension d is approximately 2 inches, oblique angle α of the V-groove may be from 1 to 4 degrees, and moreover, may be from 2 to 3 degrees. The skilled artisan will recognize, however, that other ranges of angle α may be used for mounting to surfaces having other ranges of radii, without departing from the spirit and scope of the present invention.

Figure 5:
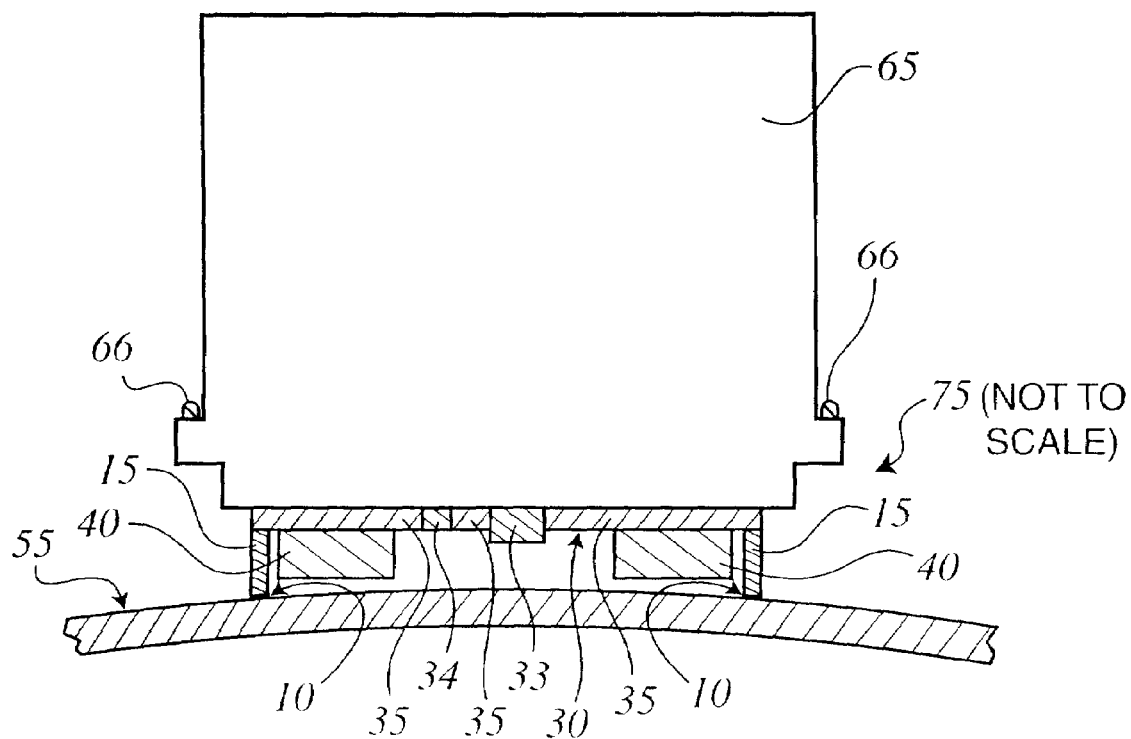
FIG. 5 is a view similar to that of FIG. 4, including a measurement device/storage tank assembly of the present invention.

Moreover, although the V-block arrangement is shown and described with respect to the generally cylindrical wall 15' of FIGS. 3 and 4, it may also be used in conjunction with the other discrete-legged embodiments disclosed herein, including those shown and described with respect to FIGS. 1, 2, and 5, without departing from the spirit and scope of this invention. For example, an assembly 50 having three, four, or more legs 15 may include one or more edges 10 that extend obliquely as described hereinabove, to define a V-groove. Moreover, additional V-grooves may be added to the continuous-plate extension embodiment of FIGS. 3 and 4. For example, a second V-groove having an apex line 17' (shown in phantom in FIG. 3) disposed orthogonally to line 17, may be provided to form an assembly having four circumferentially continuous legs configured to engage surface 55 in four non-contiguous locations thereon.

Turning now to FIG. 5, another aspect of the present invention includes a measurement device/storage tank assembly 75 including a storage tank having a rounded magnetic surface 55, and a magnetically mounted measurement device disposed at a desired position thereon. The magnetically mounted measurement device includes a measurement device 65 and a magnet mounting assembly 50, 50' as described hereinabove.

As shown, measurement device 65, such as, for example, a conventional propane monitor, is coupled to the exterior face 31 of support plate 35 utilizing a fastener 33 extending through aperture 32 of the support plate 35 (not drawn to scale). An aperture 34 may optionally be provided/used to help position the device 65 in a desired location and orientation on the support plate 35, either by enabling a user to look through the aperture 34 to provide a visual indication of proper alignment, or by enabling a pin or other fastener (not shown) to pass from the device 65 through the aperture.

In one embodiment of the measurement device/storage tank assembly 75 of this invention, the plate extension includes four legs 15 having heights greater than the heights of the remainder of the plate extension, and contacts the rounded magnetic surface 50 in four non-contiguous locations thereon. In another embodiment, the plate extension forms a V-block, in which edges 10, 10' form a V-groove, as discussed hereinabove, and tangentially contact the rounded magnetic surface.

Additional aspects of the invention include a method of detachably mounting a device 65 to a rounded magnetic surface, which method includes providing a magnet mounting assembly 50, providing a device 65, engaging the device with the support plate 35, and engaging the magnetic mounting device to a rounded ferromagnetic surface, so that edges of the legs engage the rounded ferromagnetic surface in a plurality of non-contiguous locations thereon.

In another embodiment, the method of mounting a device of this invention includes using a mounting assembly 50' configured as a V-block. In this embodiment, the flux from the magnet 40 is directed to the edge, so that a V-groove of the V-block contacts the rounded ferromagnetic surface tangentially. Optionally, the V-groove may make contact at four non-contiguous locations on the rounded magnetic surface.

Additionally, rather than forming a V-groove, edges 10, 10' may be configured to define various other geometries, such as portions of a sphere, cylinder, or cone, without departing from the spirit and scope of the present invention.

In a further variation of the foregoing methods of the present invention, the support plate of the magnet mounting assembly may be provided with an aperture, and the method may include coupling a device to the exterior face of the support plate using a fastener extending through the aperture. Moreover, alternatively, the support plate may include an aperture 34, and the method may include aligning the device on the support plate in a desired position and orientation by mating a structure (e.g., a pin) on the device with the aperture 34.

Typically, when detachably mounting the device including the magnet mounting assembly of the present invention to a rounded magnetic surface, the device is placed on the rounded magnetic surface and then is rotated slightly until a stable mounting is obtained in which the edge 10, 10' contacts the rounded magnetic surface in several (e.g., four) non-contiguous locations. This non-contiguous contact tends to prevent rocking of the assembly relative to the surface 55, such as may otherwise occur due to imperfections in the surface 55. Moreover, as discussed hereinabove, the non-contiguous contact advantageously permits the assembly 50, 50' of this invention to make stable (i.e., non-rocking) contact with surfaces 50 having a variety of topologies. For example, the four legged assembly shown in FIGS. 1 and 2 may be used to provide stable contact with both spherical and cylindrical surfaces 55. This contrasts with three legged configurations which tend to provide stable engagement with spherical surfaces, but not with cylindrical surfaces.

While the invention has been described in detail and with reference to specific embodiments thereof, it will be apparent to one skilled in the art that various changes and modifications can be made without departing from the spirit and scope thereof.

What is claimed is:

1. A magnet mounting assembly for use in detachably mounting a device to a rounded ferromagnetic surface of a liquid storage tank, said assembly comprising:
   a ferromagnetic support plate including a central axis, and an interior face;
   a ferromagnetic plate extension depending from said interior face;
   a permanent magnet disposed on said interior face; and
   said plate extension being sized and shaped with a plurality of axial heights relative to said plate, to form a plurality of legs having terminal edges, said edges being configured to engage the rounded ferromagnetic surface at a plurality of non-contiguous locations thereon;
   said legs depending immovably from said support plate, wherein said support plate and said plate extension comprise a solid state device;
   wherein said legs are spaced from one another to provide clearance therebetween;
   said legs being substantially equidistantly spaced from one another; and said legs collectively forming less than or equal to 50% of a notional periphery of the assembly.

2. The assembly of claim 1, wherein said support plate is substantially flat.

3. The assembly of claim 1, wherein said plate extension extends substantially orthogonally relative to said interior face of said support plate.

4. The assembly of claim 1, wherein said edges define a geometry having a transverse dimension d disposed orthogonally to said axis, said edges are disposed at an oblique angle α relative to said transverse dimension, and a ratio of said transverse dimension d (in inches) to said angle α (in degrees) is within a range of about 1:0.5 to 1:2.

5. The assembly of claim 1, wherein said periphery of said support plate is rounded in a transverse plane orthogonal to said axial direction.

6. The assembly of claim 1, wherein said periphery of said support plate is substantially circular in said transverse plane.

7. The assembly of claim 1, wherein said rounded ferromagnetic surface is an exterior surface of a storage tank.

8. The assembly of claim 1, wherein said rounded ferromagnetic surface is cylindrical.

9. The assembly of claim 1, wherein said rounded magnetic surface is spherical.

10. The assembly of claim 1, wherein said magnet is bonded to said interior face of said support plate with an adhesive.

11. The assembly of claim 1, wherein said magnet is a ceramic disc magnet.

12. The assembly of claim 1, wherein said support plate comprises a mounting aperture.

13. The assembly of claim 1, wherein said support plate comprises an alignment aperture.

14. The assembly of claim 1, wherein said support plate and said plate extension comprise a metal selected from the group consisting of iron and nickel.

15. The assembly of claim 1, wherein said support plate and said plate extension are sized and shaped to direct the flux from said magnet to said terminal edges.

16. A method of detachably mounting a device to a rounded magnetic surface, said method comprising:
   providing a magnet mounting assembly of the type set forth in claim 1;
   providing a device;
   disposing the device on an exterior face of the support plate to form a magnetic mounting device; and
   engaging said magnetic mounting assembly with a rounded magnetic surface, wherein the terminal edges of the legs contact the rounded magnetic surface in a plurality of non-contiguous locations thereon.

17. The method of claim 16, wherein the flux from said magnet is directed to the terminal edges of said legs.

18. The method of claim 16, wherein said plate extension comprises a V-block including one or more V-grooves, wherein the one or more V-grooves engage the rounded magnetic surface tangentially at a plurality of non-contiguous locations thereon.

19. The method of claim 16, wherein said device is a measurement device.

20. The method of claim 16, wherein said support plate includes an aperture, and said disposing comprises disposing the device to the exterior face of the support plate with a fastener extending through the aperture.

21. The method of claim 20, wherein said support plate includes an alignment aperture, and said disposing comprises aligning a portion of the device with the alignment aperture.

22. The assembly of claim 1, wherein said support plate and said plate extension comprise a non-sparking surface layer.

23. The assembly of claim 22, wherein said non-sparking surface layer is selected from the group consisting of brass and stainless steel.

24. The assembly of claim 1, comprising a V-block, wherein said edges of said legs define at least a pair of mutually intersecting planes forming a V-groove.

25. The assembly of claim 24, comprising one or more V-grooves configured to contact said rounded ferromagnetic surface tangentially in four non-contiguous locations on said rounded magnetic surface.

26. The assembly of claim 24, wherein said planes of said one or more V-grooves are disposed at an angle $\alpha$ of from 1 to 4 degrees relative to a plane orthogonal to said axis.

27. The assembly of claim 26, wherein said angle is from 2 to 3 degrees.

28. The assembly of claim 24, comprising two legs.

29. The assembly of claim 28, comprising four legs.

30. The assembly of claim 28, wherein said plate extension extends continuously about said periphery.

31. The assembly of claim 24, wherein axial heights of said planes are greater than an axial height of said magnet.

32. The assembly of claim 31, wherein said magnet is free of said mutually intersecting planes.

33. A magnet mounting assembly for use in detachably mounting a device to a rounded ferromagnetic surface of a liquid storage tank, said assembly comprising:

a ferromagnetic support plate having a central axis, a perimeter, an exterior face, an interior face, and a ferromagnetic plate extension depending from said perimeter, said plate extension being on the same side of said support plate as said interior face and having a plurality of heights;

a permanent magnet disposed on said interior face; and said plate extension including tank-engagable leg portions having axial heights greater than the axial heights of the remainder of said plate extension, wherein said tank-engagable leg portions are spaced from one another to provide clearance there between;

said tank-engagable leg portions being substantially equidistantly spaced from one another, said tank-engagable leg portions collectively forming less than or equal to 50% of a notional periphery of the assembly; and said plate extension and said legs depending immovable from said support plate, to form a solid state device.

* * * * *